US012759352B2

(12) United States Patent
Wheat et al.

(10) Patent No.: US 12,759,352 B2

(45) Date of Patent: Oct. 13, 2026

(54) SENSOR INSTALLATION TOOL

(71) Applicant: Rush Group Limited, L.L.C., Wayne, MI (US)

(72) Inventors: William Wheat, Lansing, MI (US); Eric Huck, Oakland Township, MI (US)

(73) Assignee: Rush Group Limited, L.L.C., Wayne, MI (US)

(*) Notice: Subject to any disclaimer, the term of this patent is extended or adjusted under 35 U.S.C. 154(b) by 216 days.

(21) Appl. No.: 18/923,863

(22) Filed: Oct. 23, 2024

(65) Prior Publication Data

US 2026/0109184 A1 Apr. 23, 2026

(51) Int. Cl.

*B25B 27/00* (2006.01)
*B25B 27/02* (2006.01)
*B60C 25/18* (2006.01)

(52) U.S. Cl.

CPC .............. *B60C 25/18* (2013.01); *B25B 27/02* (2013.01)

(58) Field of Classification Search

CPC .......... B25B 27/00; B25B 27/02; B25B 27/10
See application file for complete search history.

(56) References Cited

U.S. PATENT DOCUMENTS 3,908,438 A * 9/1975 Norden .................. B25B 27/00 254/131
5,219,438 A * 6/1993 Moore ..................... B25B 7/02 294/16
7,444,860 B1 11/2008 Poparad
2008/0163471 A1* 7/2008 Spaulding ........... B25B 27/0035 29/221.5
2016/0303929 A1 10/2016 Deniau et al.
2018/0186201 A1 7/2018 Hsu et al.
2021/0296800 A1* 9/2021 Sykes ...................... H01R 4/66
2025/0375856 A1* 12/2025 Darby ...................... B25B 5/006
2026/0084269 A1* 3/2026 Troublefield ........... B25B 13/14
2026/0109184 A1* 4/2026 Wheat ..................... B25B 27/02

FOREIGN PATENT DOCUMENTS

CN 210939052 U 7/2020

* cited by examiner

*Primary Examiner* — Lee D Wilson

(74) *Attorney, Agent, or Firm* — Varnum LLP

(57) ABSTRACT

A tool for installing a sensor within a valve hole of a wheel is provided. The tool comprises a body having a handle portion and a head portion. A hook element and an insertion element are each pivotably coupled to the head portion. The insertion element comprises a pocket adapted to receive the sensor and an alignment nib for aligning the sensor in the valve hole. The handle portion is pivotable via lever action when the hook element is engaged with an outwardly facing wheel surface, and the insertion element is engaged with a barrel of the wheel, thereby facilitating insertion of the sensor through the valve hole. When the sensor is fully seated within the valve hole, the insertion element further contacts an inwardly facing wheel surface, thereby preventing over-insertion of the sensor and signaling that the sensor is fully seated in the valve hole.

20 Claims, 7 Drawing Sheets

SENSOR INSTALLATION TOOL

TECHNICAL FIELD

The subject innovation pertains to a tool for installing a monitoring sensor. More particularly, the subject innovation pertains to a tool for installing a tire pressure monitoring sensor within a mounting aperture of a wheel.

BACKGROUND

Tire pressure monitoring sensors may be installed via a variety of tools and methods known in the art. For example, such sensors may be installed by hand via a plurality of tools including but not limited to sockets and wrenches. Alternatively, tire pressure monitoring sensors may be installed via a specialized insertion tool. However, such specialized insertion tools known in the art often do not provide tactile feedback when the tire pressure monitoring sensor is fully seated within the valve hole or mounting aperture of a wheel, thereby causing ambiguity regarding whether the tire pressure monitoring sensor is fully seated within the valve hole or mounting aperture. Additionally, such tools may permit over-insertion of the tire pressure monitoring sensor within the valve hole or mounting aperture.

SUMMARY

A tool for installing a sensor within a wheel, wherein the wheel defines an inwardly facing wheel surface and an outwardly facing wheel surface such that a mounting aperture is defined by the inwardly facing wheel surface, is provided. The tool comprises a tool body with a handle portion extending from a first end to a distal end and a head portion operatively coupled to the handle portion at the first end. The head portion comprises a neck and a pair of arms, wherein the arms are spaced apart from one another and each arm extends substantially parallel to the other arm from the neck to a respective distal surface.

The tool further comprises a hook element with an interface portion defining an inner profile surface. A non-marring substrate is disposed in contact with and fixedly attached to the inner profile surface such that the interface portion is configured to selectively and releasably engage the outwardly facing wheel surface adjacent to the mounting aperture via the non-marring substrate. A hook element attachment portion is integrally formed with the interface portion, wherein the attachment portion is disposed between the pair of arms of the head portion of the tool body.

The tool further comprises an insertion element with an insertion element attachment portion disposed between the pair of arms of the head portion of the tool body and adjacent to the hook element attachment portion. A guide portion is operatively coupled to the attachment portion, and the guide portion comprises a bottom surface and a plurality of sides. The bottom surface and the plurality of sides collectively define a pocket configured to receive the sensor and align the sensor with the mounting aperture for insertion therethrough. Additionally, one of the plurality of sides further defines at least one alignment nib that extends outwardly from the respective one of the plurality of sides.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The embodiments set forth in the drawings are illustrative and exemplary in nature and not intended to limit the subject matter. The following detailed description of the illustrative embodiments can be better understood when read in connection with the following drawings, wherein like structures are indicated with like reference numerals and in which.

DETAILED DESCRIPTION

Figure 1:
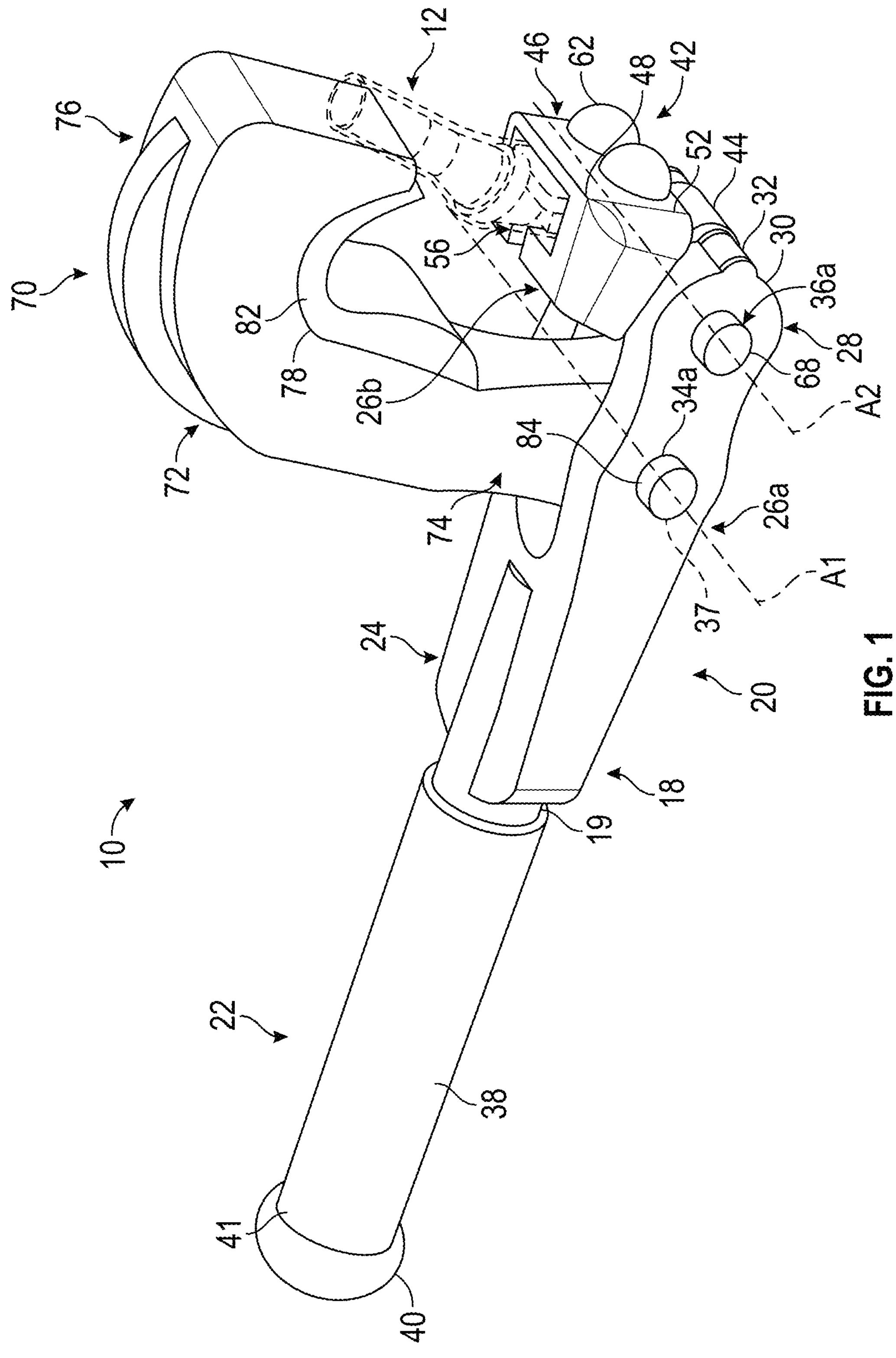
FIG. 1 is a schematic illustration of a side perspective view of a tool for installing a monitoring sensor according to a first example embodiment of the present disclosure.

While the present disclosure may be described with respect to specific applications or industries, those skilled in the art will recognize the broader applicability of the disclosure.

The terms "a", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

For consistency and convenience, directional adjectives are employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims. Any numerical designations, such as "first" or "second" are illustrative only and are not intended to limit the scope of the disclosure in any way.

The term "longitudinal", as used throughout this detailed description and in the claims, refers to a direction extending a length of a component. The term "forward" or "anterior" is used to refer to the general direction from front to back of the respective component, and the term "rearward" or "posterior" is used to refer to the opposite direction. In some cases, a component may be identified with a longitudinal axis as well as a forward and rearward longitudinal direction along that axis. The longitudinal direction or axis may also be referred to as an anterior-posterior direction or axis.

The term "transverse", as used throughout this detailed description and in the claims, refers to a direction extending a width of a component. The transverse direction or axis may also be referred to as a lateral direction or axis or a mediolateral direction or axis.

The term "vertical", as used throughout this detailed description and in the claims, refers to a direction generally perpendicular to both the lateral and longitudinal directions. The term "upward" or "upwards" refers to the vertical direction pointing towards a top of the component. The term "downward" or "downwards" refers to the vertical direction pointing opposite the upwards direction, toward the bottom of a component. In addition, the term "proximal" refers to a direction that is nearer and the term "distal" refers to a relative position that is further away. Thus, the terms proximal and distal may be understood to provide generally opposing terms to describe relative spatial positions.

Referring to the Figures, wherein like numerals indicate like or corresponding parts throughout the several views, a tool for installing a monitoring sensor 12, e.g., a tire pressure monitoring sensor, into a mounting aperture of valve hole 16 defined by an automobile wheel 14 is shown generally at 10. The tool 10 is designed to provide significant improvements to the ergonomics and useability of traditional insertion tools. In a general sense, the tool 10 allows a user to align a valve stem of the tire pressure monitoring sensor 12 with a valve hole 16 defined by an inwardly facing wheel surface 11 of the wheel 14, insert the valve stem of the tire pressure monitoring sensor 12 through the valve hole 16, and supply sufficient force via a lever action of the tool 10 to fully seat and secure the tire pressure monitoring sensor 12 within the valve hole 16 of the wheel 14 for completing the installation process. Advantageously, the tool 10 of the present disclosure is designed to provide the user with tactile feedback when the tire pressure monitoring sensor 12 is fully seated within the valve hole 16, thereby avoiding over-insertion. Moreover, the tool 10 of the present disclosure is designed to preserve the surface finish on the outwardly facing wheel surface 15, which is opposite the inwardly facing wheel surface 11 that defines the valve hole 16.

Figure 2:
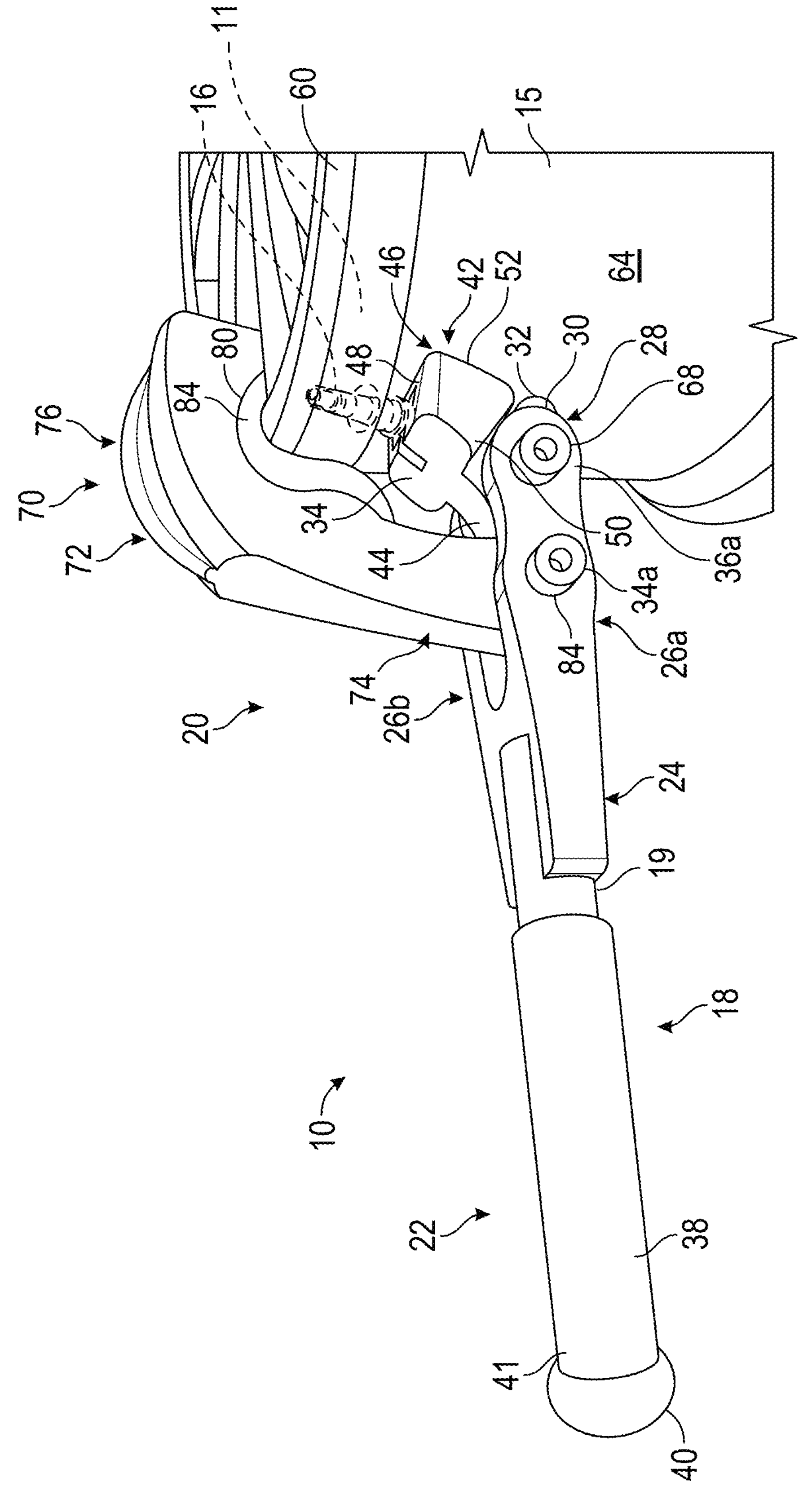
FIG. 2 is a schematic illustration of a side perspective view of the tool of FIG. 1 showing a hook element of the tool engaged with an outwardly facing wheel surface and the monitoring sensor inserted into a valve hole or mounting aperture defined by an inwardly facing wheel surface.
Figure 3:
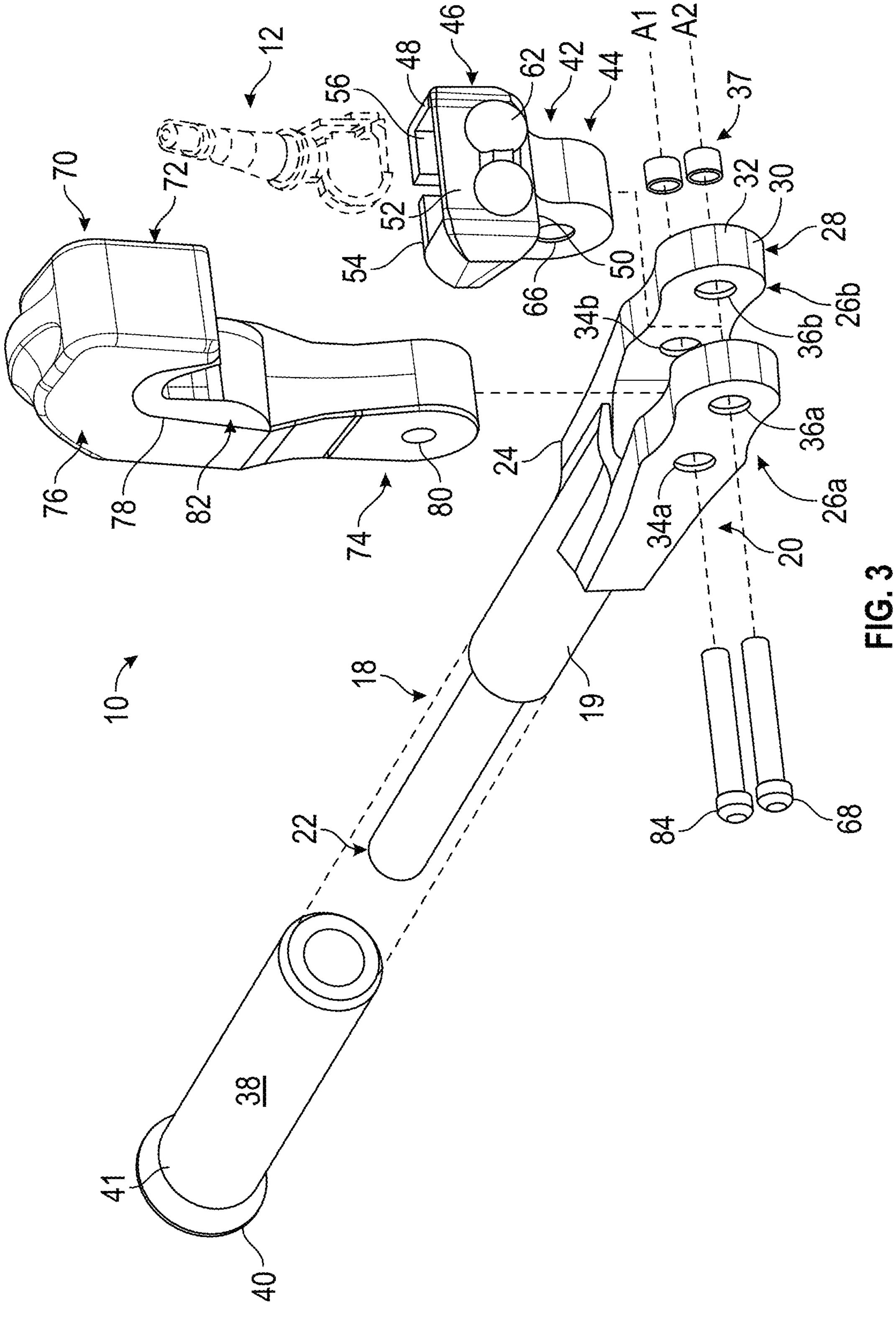
FIG. 3 is a schematic illustration of an exploded view of the tool of FIG. 1.

Referring to FIGS. 1-3, the tool 10 comprises a tool body 18, an insertion element 42, and a hook element 70, wherein the insertion element 42 and the hook element 70 are operatively coupled to the tool body 18. The tool body 18, the insertion element 42, and the hook element 70 are each contemplated to be formed of a durable, low weight, and non-marring material, such as, by way of non-limiting example, carbon fiber reinforced nylon. However, it is understood that the tool body 18, insertion element 42, and hook element 70 may comprise any suitable alternative material without varying the scope of the innovation.

The tool body 18 further comprises a head portion 20 and a handle portion 22. The handle portion 22 of the tool body 18 extends between a first end 19 and a distal end 41 and may be formed in a cylindrical shape. The handle portion 22 is operatively coupled to the head portion 20 at the first end 19. In one example embodiment of the tool 10, the handle portion 22 may be integrally formed with or fixedly attached to the head portion 20 at the first end 19.

The handle portion 22 may further be encased with a handle cover 38 for enhancing a user's grip on the tool 10. The handle cover 38 may extend from the head portion 20 of the tool body 18 to the distal end 41 of the handle portion 22, the handle cover 38 further comprising a pommel 40 disposed at the distal end 41 thereof. The handle cover 38 may be formed or composed of an elastomeric or polymeric material. In one example embodiment of the tool 10, the handle cover 38 may be formed of a thermoplastic material; however, it is to be appreciated that the handle cover 38 may comprise any material suitable for enhancing a user's grip on the tool 10, or even omit the handle cover 38 entirely in favor of knurling directly on the handle portion 22, without varying the scope of the innovation.

The head portion 20 of the tool body 18 extends from the first end 19 of the handle portion 22 to an arcuate distal surface 30. In one example embodiment of the tool 10, the handle portion 22 may be integrally formed with or fixedly attached to the head portion 20. The head portion 20 may further comprise a neck 24 and a pair of arms **26*a*, 26*b*, wherein the neck 24 and the pair of arms 26*a*, 26*b* are formed as a single unitary piece. The pair of arms 26*a*, 26*b*, as shown in FIG. 3, are spaced apart from each other and extend longitudinally from the neck 24 to a respective distal end 28 that terminates in the arcuate distal surface 30. In one example embodiment of the tool 10, the pair of arms 26*a*, 26*b* extend from the neck 24 to their respective distal ends 28 in a substantially parallel configuration. An arcuate pivot stop 32 extends longitudinally from and is integral with each arcuate distal surface 30 of the respective arms 26*a*, 26*b***.

Figure 4:
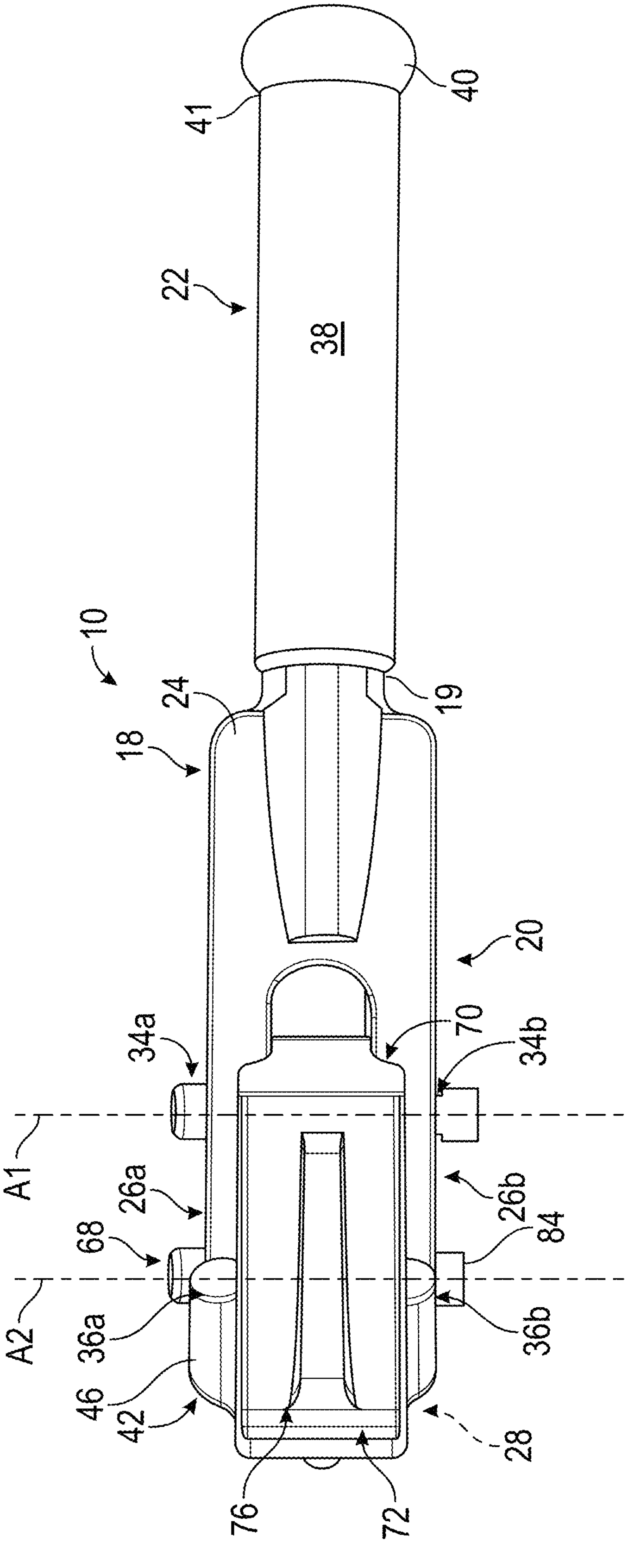
FIG. 4 is a schematic illustration of a top view of the tool of FIG. 1.

Referring to FIGS. 1 and 3, each of the pair of arms **26*a*, 26*b* includes a first set of attachment points 34*a*, 34*b* and a second set of attachment points 36*a*, 36*b*. The first set of attachment points 34*a*, 34*b* are disposed on a first lateral axis A1 and the second set of attachment points 36*a*, 36*b* are disposed on a second lateral axis A2. The first lateral axis A1** and the second lateral axis A2 are positioned substantially parallel to each other and are further longitudinally spaced apart from each other along the length of the respective arms 26*a*, 26*b*, as shown in FIGS. 1 and 4. Referring to one example embodiment of the tool 10 shown in the figures, the first set of attachment points 34*a*, 34*b* and the second set of attachment points 36*a*, 36*b* may comprise a plurality of apertures defined by the respective arms 26*a*, 26*b*. More particularly, the first set of attachment points 34*a*, 34*b* may comprise a first aperture 34*a* defined by the first arm 26*a* and a second aperture 34*b* defined by the second arm 26*b*. Analogously, the second set of attachment points 36*a*, 36*b* may comprise a third aperture 36*a* defined by the first arm 26*a* and a fourth aperture 36*b* defined by the second arm 26*b*. A bushing 37 may be integrated within each of the second aperture 34*b* and the fourth aperture 36*b*, as shown in FIG. 3.

Figure 5:
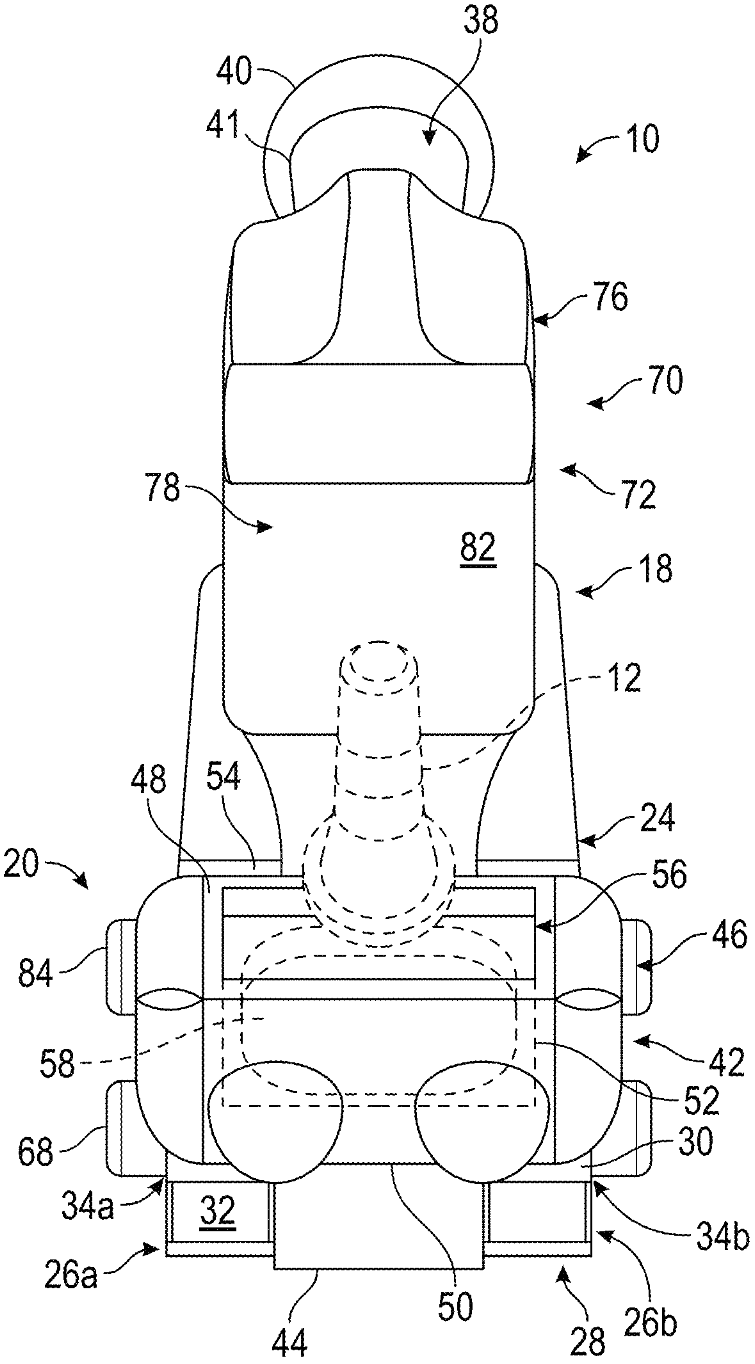
FIG. 5 is a schematic illustration of a front perspective view of the tool of FIG. 1.
Figure 6A:
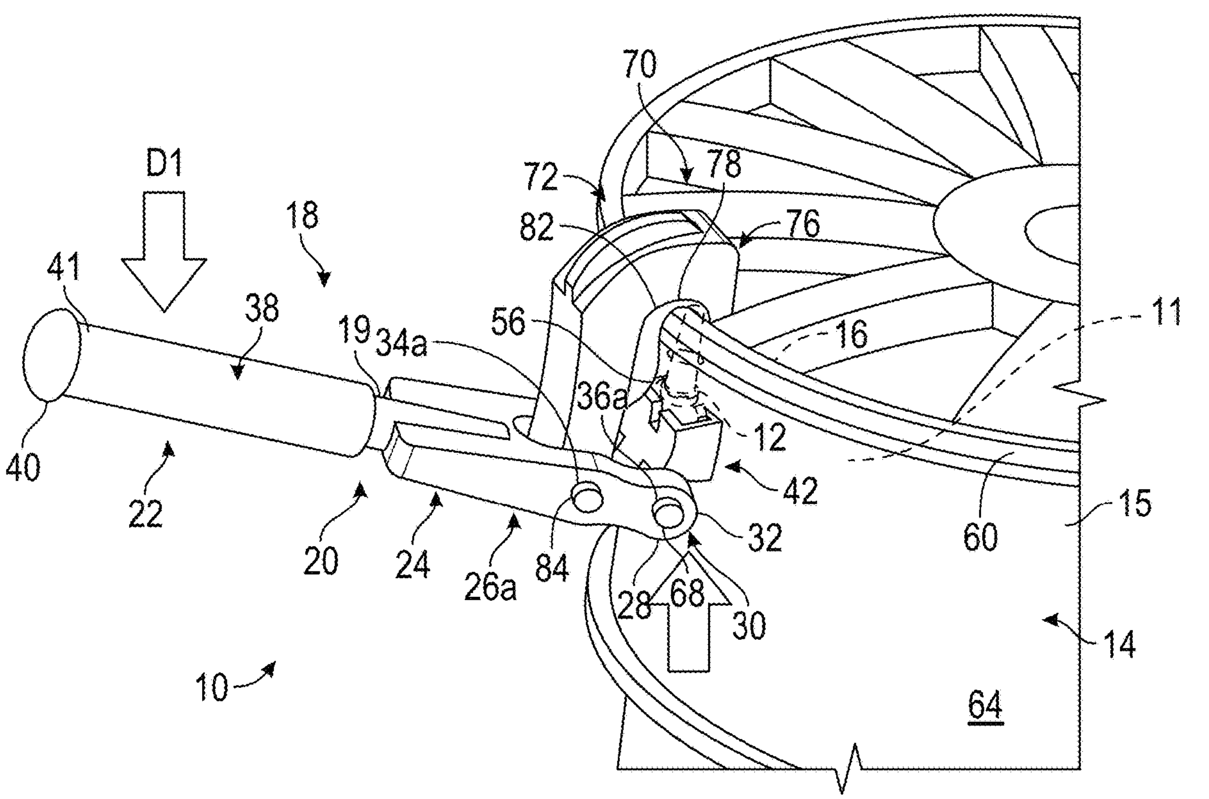
FIG. 6A is a schematic illustration of a side perspective view of the tool of FIG. 1 showing the tool disposed in a first position in which the monitoring sensor is spaced apart from the valve hole or mounting aperture defined by the inwardly facing wheel surface.
Figure 6B:
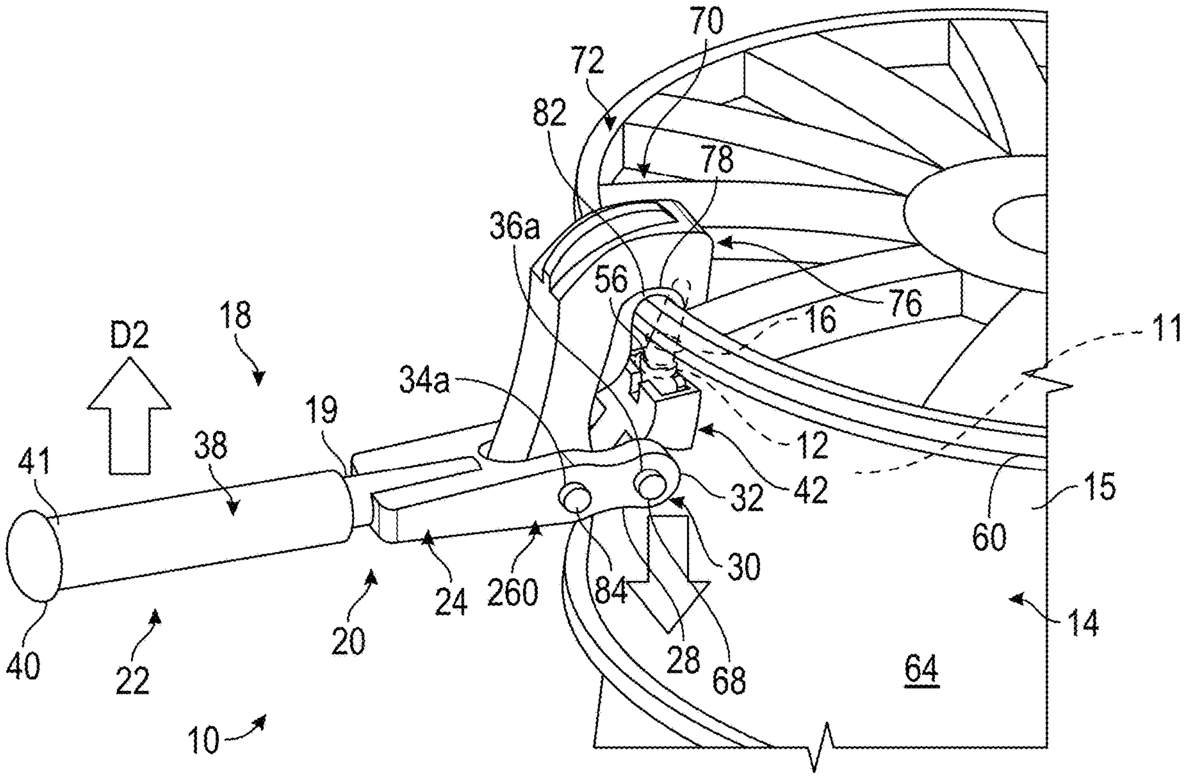
FIG. 6B is a schematic illustration of a side perspective view of the tool of FIG. 1 showing the tool disposed in a second position in which the monitoring sensor is seated within the valve hole or mounting aperture defined by the inwardly facing wheel surface.

The tool 10 further comprises an insertion element 42 that is adapted for holding and guiding the tire pressure monitoring sensor 12 as the valve stem thereof is inserted into the valve hole 16 via the lever action of the tool 10, as further detailed in FIGS. 6A and 6B. Referring to FIGS. 1, 3, and 5, the insertion element 42 comprises an attachment portion 44 and a guide portion 46. Referring again to FIG. 3, the attachment portion 44 of the insertion element 42 extends generally downwardly from a bottom surface 50 of the guide portion 46.

The attachment portion 44 is configured to be disposed between the pair of arms 26*a*, 26*b* and pivotably coupled to and held between the pair of arms 26*a*, 26*b* at the second set of attachment points 36*a*, 36*b*. More particularly, the attachment portion 44 further defines an insertion element aperture 66 that is configured to be aligned with the apertures defined within the pair of arms 26*a*, 26*b* at the second set of attachment points 36*a*, 36*b*. Said another way, the insertion element aperture 66 and the apertures associated with the second set of attachment points 36*a*, 36*b* are disposed upon the second lateral axis A2.

A pin 68 or similar fastening element engages and is secured through the apertures disposed at each of the second set of attachment points 36*a*, 36*b* defined by the pair of arms 26*a*, 26*b* and the insertion element aperture 66, thereby pivotably securing the insertion element 42 to the head 20 of the tool body 18.

The guide portion 46 of the insertion element 42 comprises a generally planar top surface 48 opposite the bottom surface 50 with front and rear faces 52, 54 extending therebetween. A pocket 56 is formed in the top surface 48 of the guide portion 46 and defines a recessed space 58, as shown in FIG. 5, adapted for receiving and holding the tire pressure monitoring sensor 12 to facilitate insertion of the valve stem through the valve hole 16 and seating of the tire pressure monitoring sensor 12 within the wheel 14. In an example embodiment of the tool 10 shown in the figures, the pocket 56 is generally rectangular in shape. However, it is to be appreciated that the shape and depth of the pocket 56 may vary to accommodate the installation of different types and styles of tire pressure monitoring sensors 12 on the wheel 14 without altering the scope of the innovation. The recessed space 58 has a predetermined depth such that the top surface 48 of the guide portion 46 is adapted to engage the inwardly facing wheel surface 11 disposed on a rim 60 of the wheel 14 adjacent to the valve hole 16 when the tire pressure monitoring sensor 12 is fully seated within the wheel 14, thereby preventing over-insertion of the tire pressure monitoring sensor 12 and providing tactile feedback that the tire pressure monitoring sensor 12 is fully installed and seated within the valve hole 16.

The guide portion 46 of the insertion element 42 further includes at least one alignment nib 62 extending outwardly from the front face 52 thereof, as shown in FIGS. 1, 3, and 5. The at least one alignment nib 62 is adapted and arranged for engaging a barrel 64 of the wheel 14 adjacent to the rim 60 for aligning the valve stem of the tire pressure monitoring sensor 12 with the valve hole 16 and guiding the valve stem therethrough. Pivotable engagement between the insertion element 42 and the head portion 20 at the pin 68 facilitates pivoting of the insertion element 42 about the second lateral axis A2 and allows for continuous engagement of the at least one alignment nib 62 with the barrel 64 of the wheel 14 for proper alignment of the tire pressure monitoring sensor 12 with the valve hole 16 during installation. Moreover, pivoting of the insertion element 42 about the second lateral axis A2 past a midpoint of the arcuate distal surfaces 30 of the pair of arms 26*a*, 26*b* is prohibited via engagement of the bottom surface 50 of the insertion element 42 with the arcuate pivot stops 32, as shown in FIG. 1.

Referring to FIGS. 1-3, the hook element 70 comprises an engagement portion 72 and an attachment portion 74. The attachment portion 74 is configured to be disposed between the pair of arms 26*a*, 26*b* and pivotably coupled to and held between the pair of arms 26*a*, 26*b* at the first set of attachment points 34*a*, 34*b*. More particularly, the attachment portion 74 further defines a hook element aperture 80 that is configured to be aligned with the apertures defined within the pair of arms 26*a*, 26*b* at the first set of attachment points 34*a*, 34*b*. Said another way, the hook element aperture 80 and the apertures associated with the first set of attachment points 34*a*, 34*b* are disposed upon the first lateral axis A1. A pin 84 or similar fastening element engages and is secured through the apertures disposed at each of the first set of attachment points 34*a*, 34*b* defined by the pair of arms 26*a*, 26*b* and the hook element aperture 80, thereby pivotably securing the hook element 70 to the head 20 of the tool body 18.

A curved interface portion 76 of the hook element 70 is integrally connected to the attachment portion 74, as the curved interface portion 76 and the attachment portion 74 are formed as a single unitary piece. The curved interface portion 76 of the hook element 70 defines an inner profile surface 78 having a non-marring substrate 82 applied thereto and adapted for engaging and gripping the outwardly facing wheel surface 15 at the rim 60 of the wheel 14. The non-marring substrate 82 may be comprised of a polymeric or elastomeric pad. In one example embodiment of the tool 10, the non-marring substrate 82 may be a rubber pad applied to the inner profile surface 78 of the hook element 70.

In operation, the tire pressure monitoring sensor 12 is first inserted into the pocket 56 in the guide portion 46 of the insertion element 42. Once the tire pressure monitoring sensor 12 has been placed in the pocket 56, the tool 10 is engaged with the wheel 14 at or directly adjacent to the valve hole 16. More particularly, the hook element 70 is coupled with the outwardly facing wheel surface 15 at the rim 60 of a wheel 14, such that the non-marring substrate 82 of the hook element 70 is engaged with the outwardly facing wheel surface 15 of the rim 60 of the wheel 14 at and directly above the valve hole 16 defined by the inwardly facing wheel surface 11 at the same location. Simultaneously, the at least one alignment nib 62 is engaged with the barrel 64 of the wheel 14.

The tool body 18 via the handle portion 22 is then pivoted about the first lateral axis A1 in a first direction D1 (counterclockwise as shown in FIGS. 6A and 6B) via lever action of the handle portion 22 to move the tool 10 from a first position, as shown in FIG. 6A, in which the insertion element 42 and tire pressure monitoring sensor 12 are vertically spaced apart from the valve hole 16, to a second position, shown in FIG. 6B, in which the top surface 48 of the attachment portion 44 is engaged with the rim 60 and sufficient force is applied to insert and fully seat the tire pressure monitoring sensor 12 within the valve hole 16. During movement of the tool body 18 from the first position to the second position, the insertion element 42 correspondingly pivots about the second lateral axis A2 in the first direction D1 such that the at least one alignment nib 62 remains continuously engaged with and slides vertically up the barrel 64 of the wheel 14 to ensure the tire pressure monitoring sensor 12 remains aligned with the valve hole 16 for proper seating thereof.

Engagement of the top surface 48 of the attachment portion 44 with the inwardly facing wheel surface 11 at the rim 60 signals that the tire pressure monitoring sensor 12 has been fully seated within the valve hole 16, thereby providing tactile feedback to a user of the tool 10 to indicate that the tire pressure monitoring sensor 12 is fully seated and installation is complete, such that no further rotation of the handle portion 22 in the first direction D1 is required. Such tactile feedback assists the user in avoiding over-insertion of the tire pressure monitoring sensor 12 into the valve hole 16.

Once the tire pressure monitoring sensor 12 is fully seated within the valve hole 16, the tool body 18 can then be pivoted about the first lateral axis A1 in a second direction D2 (clockwise as shown in FIGS. 6A and 6B) via lever action of the handle portion 22 to move the tool 10 from the second position back to the first position for removal of the tool 10 from the wheel 14.

While various embodiments have been described, the description is intended to be exemplary, rather than limiting and it will be apparent to those of ordinary skill in the art that many more embodiments and implementations are possible that are within the scope of the embodiments. While some of the best modes and other embodiments for carrying out the present teachings have been described in detail, various alternative designs and embodiments exist for practicing the present teachings defined in the appended claims. Any feature of any embodiment may be used in combination with or substituted for any other feature or element in any other embodiment unless specifically restricted. Accordingly, the embodiments are not to be restricted except in light of the attached claims and their equivalents. Many modifications and variations of the present invention are possible in light of the above teachings and within the scope of the attached claims. It is, therefore, to be understood that within the scope of the appended claims, the invention may be practiced other than as specifically described.

Benefits, other advantages, and solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

What is claimed is:

1. A tool for installing a sensor within a wheel, wherein the wheel defines an inwardly facing wheel surface and an outwardly facing wheel surface such that a mounting aperture is defined by the inwardly facing wheel surface, the tool comprising:

a tool body comprising:

a handle portion extending from a first end to a distal end; and a head portion operatively coupled to the handle portion at the first end, the head portion comprising a neck and a pair of arms, wherein the arms are spaced apart from one another and each arm extends substantially parallel to the other arm from the neck to a respective distal surface;

a hook element comprising:

an interface portion defining an inner profile surface, wherein a non-marring substrate is disposed in contact with and fixedly attached to the inner profile surface such that the interface portion is configured to selectively and releasably engage the outwardly facing wheel surface adjacent to the mounting aperture via the non-marring substrate;

a hook element attachment portion integrally formed with the interface portion, wherein the attachment portion is disposed between the pair of arms of the head portion of the tool body;

an insertion element comprising:

an insertion element attachment portion disposed between the pair of arms of the head portion of the tool body and adjacent to the hook element attachment portion; and a guide portion operatively coupled to the attachment portion, the guide portion comprising a bottom surface and a plurality of sides, wherein the bottom surface and the plurality of sides collectively define a pocket configured to receive the sensor and align the sensor with the mounting aperture for insertion therethrough, and wherein one of the plurality of sides further defines at least one alignment nib that extends outwardly from the respective one of the plurality of sides.

2. The tool of claim 1 wherein each of the tool body, the hook element, and the insertion element are comprised of a nylon material.

3. The tool of claim 2 wherein the nylon material is a carbon fiber-reinforced nylon material.

4. The tool of claim 3 wherein the non-marring substrate comprises one of a polymeric material and an elastomeric material.

5. The tool of claim 4 wherein the non-marring substrate comprises a polymeric material.

6. The tool of claim 4 wherein the non-marring substrate comprises an elastomeric material.

7. The tool of claim 4 wherein the handle portion extends from the head portion to a distal end, the handle portion further comprising a handle cover and a pommel disposed at the distal end.

8. The tool of claim 7 wherein the handle cover comprises a thermoplastic material.

9. The tool of claim 4 wherein the pair of arms defines a first set of attachment points disposed on a first lateral axis and a second set of attachment points disposed on a second lateral axis, wherein the first lateral axis is spaced apart from and substantially parallel to the second lateral axis.

10. The tool of claim 9 wherein the first set of attachment points comprises a first aperture defined by one arm and a second aperture defined by the other arm, and wherein the second set of attachment points comprises a third aperture defined by one arm and a fourth aperture defined by the other arm.

11. The tool of claim 10 wherein a bushing is received by each of the second aperture and the fourth aperture.

12. The tool of claim 10 wherein the hook element attachment portion further defines a hook element aperture that is disposed on the first lateral axis and aligned with the first set of attachment points, the tool further comprising a first pin feature configured to be received by the first aperture, the hook element aperture, and the third aperture to thereby operatively couple the hook element with the head portion of the tool body.

13. The tool of claim 12 wherein the insertion element attachment portion further defines an insertion element aperture that is disposed on the second lateral axis and aligned with the second set of attachment points, the tool further comprising a second pin feature configured to be received by the second aperture, the insertion element aperture, and the fourth aperture to thereby operatively couple the insertion element and the head portion of the tool body.

14. The tool of claim 13 wherein the insertion element is pivotable about the second lateral axis and the tool body is pivotable about the first lateral axis between a first position and a second position.

15. The tool of claim 14 wherein the plurality of sides of the insertion element further defines a top surface configured to selectively and releasably engage the inwardly facing wheel surface adjacent to the mounting aperture.

16. The tool of claim 15, wherein, when the non-marring substrate of the hook element is engaged with the outwardly facing wheel surface, the handle portion of the tool body is rotated in a first direction, thereby transitioning the tool from the first position to the second position, wherein, in the second position, the top surface of the insertion element is engaged with the inwardly facing wheel surface, and the alignment nib is engaged with the wheel, to thereby fully seat the sensor within the mounting aperture.

17. The tool of claim 16 wherein each of the pair of arms comprises an arcuate pivot stop extending from the distal surface thereof.

18. The tool of claim 17 wherein pivoting of the insertion element about the second lateral axis past a midpoint of the distal surfaces of the pair of arms is prohibited via engagement of the bottom surface of the insertion element with the arcuate pivot stops.

19. The tool of claim 18 wherein the handle portion of the tool body is integrally formed with the head portion at the first end.

20. The tool of claim 19 wherein the handle portion of the tool body is formed in a cylindrical shape.

* * * * *